(12) United States Patent
Wagner et al.

(10) Patent No.: US 12,103,473 B2
(45) Date of Patent: Oct. 1, 2024

(54) VEHICLE INTERIOR TRIM PART WITH AN INTEGRATED ELECTRICAL OR OPTICAL DEVICE

(71) Applicant: Faurecia Innenraum Systeme GmbH, Hagenbach (DE)

(72) Inventors: Christophe Wagner, Salmbach (FR); Hugo Bonvalet, Hagenbach (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 261 days.

(21) Appl. No.: 17/662,887

(22) Filed: May 11, 2022

(65) Prior Publication Data
US 2022/0363206 A1 Nov. 17, 2022

(30) Foreign Application Priority Data
May 12, 2021 (DE) ...................... 10 2021 204 844.7

(51) Int. Cl.
*B60R 16/02* (2006.01)
*B60R 13/02* (2006.01)

(52) U.S. Cl.
CPC .............. *B60R 16/02* (2013.01); *B60R 13/02* (2013.01); *B60R 2013/0287* (2013.01)

(58) Field of Classification Search
CPC . B60R 16/02; B60R 13/02; B60R 2013/0287; H01R 13/02; H01R 13/40; H01R 2201/26
See application file for complete search history.

(56) References Cited

U.S. PATENT DOCUMENTS 6,000,959 A * 12/1999 Curtindale ............. B60J 5/0418
439/246

FOREIGN PATENT DOCUMENTS

| DE | 69710570 T2 | 3/2002 |
| DE | 10250892 A1 | 6/2003 |
| EP | 3153293 A1 | 4/2017 |

OTHER PUBLICATIONS

"German Application Serial No. 10 2021 204 844.7, Search Report dated Feb. 21, 2022", w/ Concise Statement of Relevance, (Feb. 21, 2022), 9 pgs.

* cited by examiner

*Primary Examiner* — Jacob M Amick
*Assistant Examiner* — Charles J Brauch
(74) *Attorney, Agent, or Firm* — Schwegman Lundberg & Woessner, P.A.

(57) ABSTRACT

The present disclosure relates to a vehicle interior trim part with an integrated electrical or optical device, the vehicle interior trim part comprising a carrier and a connector element for connecting the electrical or optical device. The connector element comprises at least one connector pin operatively connected to the electrical or optical device, a guide element in which the connector pin is partially received, and which is adapted to provide a plug receptacle for a positive connection of the connector pin, and a base element extending substantially laterally with respect to the carrier.

20 Claims, 4 Drawing Sheets

VEHICLE INTERIOR TRIM PART WITH AN INTEGRATED ELECTRICAL OR OPTICAL DEVICE

CLAIM FOR PRIORITY

This application claims the benefit of priority of German Application No. 10 2021 204 844.7, filed May 12, 2021, which is hereby incorporated by reference in its entirety.

TECHNICAL FIELD

The present disclosure relates to a vehicle interior trim part with an integrated electrical or optical device. In particular, the present disclosure relates to a vehicle interior trim part providing a connector element for connecting the electrical or optical device, so that the electrical or optical device can be controlled or fed via the connector element. Furthermore, the application relates to a method for manufacturing a corresponding vehicle interior trim part. The vehicle interior trim part can in particular be a vehicle interior trim part which is manufactured in an injection molding process and into which the electrical or optical device is integrated. The electrical or optical device can, for example, comprise a heating device, lighting, an optical or a sensory device, which can be controlled and fed via the connector element provided in the vehicle interior trim part.

BACKGROUND

Vehicle interior trim parts with integrated electrical and optical devices are known from the prior art. These include, in particular, heating devices that are integrated in the vehicle interior trim in the form of heating mats and provide a heating or de-icing function for the trim parts. Said devices also comprise light-emitting devices integrated into the vehicle interior trim in the form of optical fibers or LEDs and provide lighting, particularly decorative lighting. Injection molding methods are often used in the manufacture of such vehicle interior trim parts, in which methods the electrical or optical device is overmolded in the trim part or is subsequently inserted into the trim part. In this case, the connector element required for connecting the heating device or the light-emitting device to the vehicle electrics is subsequently provided in some vehicle interior trim parts and connected to the heating device or to the light-emitting device. Alternatively, in a light-emitting device, the connecting of the device to a light source external to the trim part can take place by means of fiber optics, the light source being part of the vehicle electrical system. This requires additional manufacturing steps, such as subsequent soldering of a connector plug to the heating device and attaching the plug to the vehicle interior trim part or subsequent coupling of the light source into the optical device. In addition, the corresponding connector elements may have insufficient stability or lead to undesirable vibration noises when the vehicle is operated. The injection molding processes for manufacturing such vehicle interior trim parts are often complex and error-prone.

SUMMARY/OVERVIEW

The present disclosure is therefore based on the object of proposing a vehicle interior trim part with an integrated electrical device, the vehicle interior trim part providing a connector element for connecting the electrical or optical device. In particular, it can be an object of the present disclosure to increase the stability of a vehicle interior trim part with an integrated electrical or optical device. A further object of the present disclosure can be to propose an alternative and/or improved manufacturing method for manufacturing a corresponding vehicle interior trim part.

The proposed vehicle interior trim part with an integrated electrical or optical device comprises a carrier and a connector element for connecting the electrical or optical device. The electrical or optical device can comprise, for example, a heating mat, interior lighting or a sensory device. The connector element comprises at least one connector pin operatively connected to the electrical or optical device, a guide element in which the connector pin is partially received, and which is adapted to provide a plug receptacle for a positive connection of the connector pin, and a base element extending substantially laterally with respect to the carrier. An electrical or optical signal can be transmitted through the operative connection. The connector pin is usually connected indirectly to the vehicle electrics by means of a plug.

The fact that the vehicle interior trim part already comprises a connector element with a base element that extends laterally with respect to the carrier simplifies the manufacture and assembly of the vehicle interior trim part and increases its stability.

The guide element can substantially comprise a hollow body and can be a tubular element, for example. The guide element can comprise a peripheral wall. One end of the at least one connector pin can be received in the guide part. In particular, the guide element can provide a positive receptacle for a plug, so that the guide element and the plug can form a plug connection for contacting or operatively connecting the at least one connector pin. A plurality of connector pins spaced apart from one another can be received in the guide element. The plug connection can be a commercially available plug connection. The receptacle for the plug can be provided on an end of the guide element opposite the base element. In addition, the guide element can comprise at least one latching element which is adapted to secure a plug received in the guide part.

The vehicle interior trim part can be at least partially an injection molded part. The carrier can be connected to the connector element in a positive and/or materially bonded manner. In particular, the connector element can be partially overmolded by the carrier. The carrier can encase the base element. The carrier can encase the base element at least partially in a materially bonded and/or positive manner. That is, the base element can be at least partially sealed in the carrier. The guide element can be arranged at least partially free-standing. That is, the base and a section of the guide element, in particular a section of the guide element abutting against the base element, can be overmolded by the carrier. A section of the guide element opposite the base element can be arranged free-standing.

The carrier can be connected to the electrical or optical device in a materially bonded and/or positive manner. The carrier can encase the electrical or optical device. In particular, the electrical or optical device can be at least partially overmolded by the carrier. Alternatively, the electrical or optical device and the carrier can be connected to one another by lamination. The carrier can at least partially encase the electrical or optical device, in particular encase it in a materially bonded manner. That is, the electrical or optical device can be sealed within the carrier. The electrical or optical device can have holes, depressions or projections for positive connection and/or for improved materially bonded connection to the carrier.

The base element and the guide element can be in one piece. In particular, the base element and the guide element can consist of a single injection molded part. The guide element, the base element, or both the guide element and the base element can comprise a different injection molding material than the carrier. Using different materials can be advantageous since the guide element usually requires different mechanical properties than a carrier. The guide element is usually thin-walled and usually has to be very dimensionally stable.

A base area of the base element can be larger than a base area of the guide element. In the present case, the base area means the respective boundary area that forms the base element or the guide element in a plane that is the sectional plane between the base element and the guide element. The base area usually extends in the lateral direction.

The base element can define a front away from which the guide element extends. The guide element can extend away from the front at a substantially right angle. The front can extend substantially laterally with respect to the carrier. The front can comprise an edge section. The edge section can completely or partially surround the guide element. The edge section can be spaced from the guide element. The edge section can be at least partially or fully planar. The edge section can comprise steps and/or depressions arranged between planar regions of the edge section. Recesses can be arranged at least partially between the guide element and the edge section. Support ribs can be arranged in the recesses. The support ribs can be connected to the guide element and the edge section. The support ribs can at least partially lie in one plane with the edge section or at least partially end together with the edge section. In particular, the edge section can be designed to be planar with the support ribs. Errors in the injection molding, for example, unevenness or air pockets, can thus be avoided.

The base element can further define a back opposite the front. In particular, the contact surface of the back with the carrier can define a neutral plane. The front and/or the back can extend substantially parallel with respect to the neutral plane. The back can be arranged parallel with respect to the front. The back can be substantially planar. The base element can further comprise a side area connecting the front and back. The carrier can comprise retaining ribs extending laterally with respect to and/or extending away from the carrier. The retaining ribs can be connected to the base element, preferably to the edge section of the base element, in a materially bonded and/or positive manner. In particular, the retaining ribs can be L-shaped and clasp the edge section at the front of the base element. The side area can extend at an angle with the neutral plane between the back and front and define one or more outer sides. In particular, the side area can define two opposite inclined outer sides extending at an angle between back and front. The respective inclined outer side and the back can preferably extend at an obtuse angle to each other. That is, the base element has a tapering in the direction of the neutral plane in a sectional plane that intersects the two inclined outer sides running at an angle. The side area can define two further opposite straight outer sides arranged parallel to each other. The base element can be a substantially plate-shaped element. In particular, the base element can be a substantially rectangular plate-shaped element. The broad sides of a plate-shaped base element can define the front and the back of the base element. The narrow sides of a plate-shaped base element can define the side area of the base element.

The back of the base element can be substantially planar. The edge section can be substantially planar. In particular, a height between the edge section and the neutral plane can be constant.

The at least one connector pin can be arranged partially in and/or on the base element. In an embodiment, the at least one connector pin can be completely received in the connector element and/or encased by the connector element. In another embodiment, part of the at least one connector pin can be arranged in an exposed manner on the connector element. The connector pin can protrude at least partially from the carrier or from the base element for a connection with a plug. The connector pin preferably protrudes perpendicularly from the carrier or from the base element. The connector pin can protrude obliquely from the carrier or from the base element. The connector pin can partially extend laterally with respect to the carrier. The at least one connector pin can extend away from its end received in the guide element at an angle, in particular at a right angle. The at least one connector pin can comprise a part that protrudes from the carrier or from the base element and a part that extends laterally with respect to the carrier or to the base element. Such an embodiment allows a good anchoring of the connector pin in the base element and connection to the electrical or optical device and the carrier. Said connector pins can extend parallel to one another in an embodiment with a plurality of connector pins. In another embodiment with a plurality of connector pins, not all of the connector pins extend parallel to one another. The at least one connector pin can extend away from its end received in the guide element through the base element or along the base element. A part of the at least one connector pin can be encased by the base element. Alternatively or additionally, a part of the connector pin can be arranged in an exposed manner on the base element. In particular, the part of the connector pin can be arranged in an exposed manner on the base element on which the electrical or optical device is operatively connected to the connector pin. The electrical or optical device, for example, can thus be subsequently connected to the connector element. For example, a supply line of the electrical or optical device can be soldered to the connector pin in the exposed region of the connector pin. The connector element can comprise a plurality of support elements. The at least one connector pin can be arranged partially between the support elements in its longitudinal direction. The support elements can be arranged on the front of the base element. The support elements can be arranged above the at least one connector pin relative to the back of the base element. A support and/or protective function for the at least one connector pin can be provided by the support elements. In addition, the support elements can promote a positive and/or materially bonded connection of the connector element, in particular in the region of the connector pins. In an embodiment, a plurality of connector pins can be provided, said plurality being operatively connected to the electrical or optical device and partially received within the guide element.

The carrier of the vehicle interior trim part can be made of a first plastic. The connector element can be made of a second plastic that is different from the first. The first and the second plastic can, for example, be selected from the group of the polymers polypropylene, polymethyl methacrylate, polycarbonate, polystyrene and acrylonitrile butadiene styrene. The first and the second plastic can be selected such that they are compatible with one another, so that a materially bonded connection is created between the carrier and the connector element during the injection molding of the vehicle interior trim part. Alternatively, the first and the second plastic can be selected such that they are incompatible with one another, so that a positive connection is created between the carrier and the connector element during the injection molding of the vehicle interior trim part.

The vehicle interior trim part can have a visible side and an opposite back. The connector element can be arranged on the back of the vehicle interior trim part. The connector element can be arranged such that the guide element extends away from the back of the vehicle interior trim part. The electrical device can be arranged between the visible side and the back of the vehicle interior trim part.

Furthermore, the present disclosure relates to a method for manufacturing a vehicle interior trim part with an integrated electrical or optical device as described above. The method comprises the following steps:

I. providing at least one connector pin;
II. injection molding of a connector element, the connector element comprising a base element and a guide element and the at least one connector pin being at least partially received in the guide element and the guide element being adapted to provide a plug receptacle for a positive connection of the connector pin;
III. providing an electrical or optical device;
IV. operatively connecting the electrical or optical device to the at least one connector pin;
V. at least partial overmolding of the connector element and the electrical or optical device with a carrier.

In the present case, overmolding of an element or a device is to be understood as meaning that the element or the device is completely or partially surrounded by the injection molding material. Overmolding also comprises back-molding. The carrier can be at least partially materially bonded and/or positively connected to the connector element and the electrical or optical device by at least partially back-molding or overmolding the connector element and the electrical or optical device with the carrier.

The order of the method steps presented above is an order that does not necessarily have to be adhered to in order to carry out the method. In addition to the order shown above, the method steps can also be carried out in a modified order. In particular, steps III and IV can be carried out before steps II and V. In the order of method steps presented above, the connector pin and the connector element are first joined together and then connected to the electrical or optical device. In an alternative order in which steps III and IV are carried out before steps II and V, the connector pin is first connected to the electrical or optical device and the connector element is then injection molded.

Irrespective of the order, the connector element can comprise a different injection molding material than the carrier. Alternatively, the connector element and carrier can comprise the same injection molding material. During the process of overmoulding the connector element and the electrical or optical device with the carrier, it can further be provided that the connector element is positioned and supported by movable sliding tool elements. The sliding tool elements can positively engage two opposite inclined outer sides of the base element which extend at an angle away from the neutral plane. In particular, the sliding tool elements can engage two opposite inclined outer sides extending at an angle between the back and front of the base element, the respective inclined outer side and the back preferably being able to extend at an obtuse angle to one another.

In one embodiment of the method, at least part of the electrical or optical device can already be overmolded in step II during the injection molding of the connector element.

Several embodiments have been disclosed herein. Still further embodiments of the present disclosure will become apparent to those skilled in the art from the following detailed description, which shows and describes embodiments of the disclosure. Accordingly, the drawings and detailed description are to be regarded in an illustrative rather than a restrictive sense. Recurring features are provided with the same reference signs in the description of the figures.

BRIEF DESCRIPTION OF THE FIGURES

Shown are

DETAILED DESCRIPTION

Figure 1:
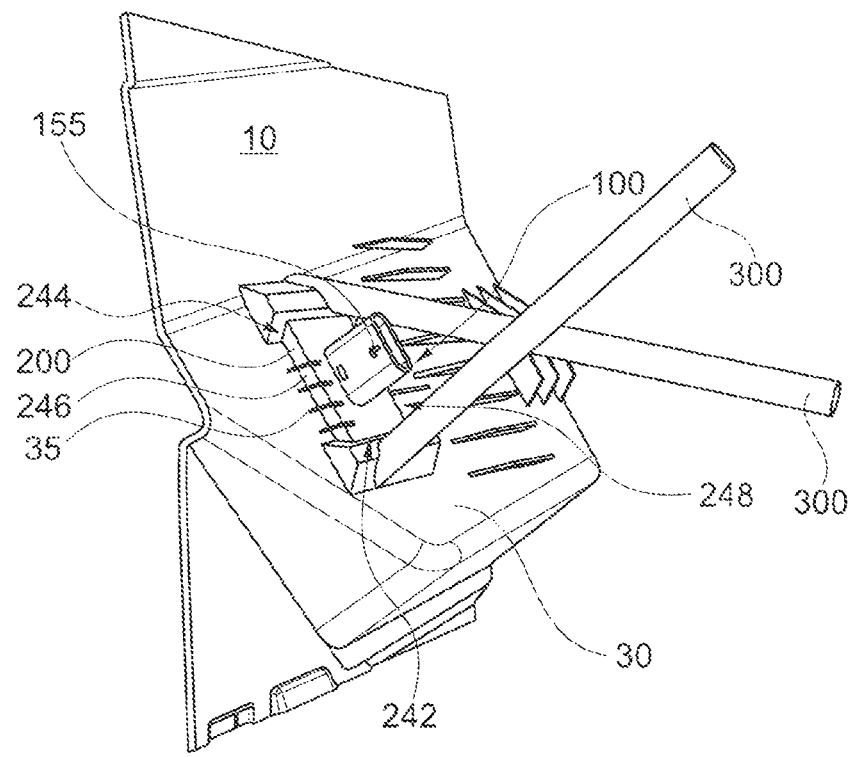
FIG. 1 a perspective representation of a vehicle interior trim with two engaging sliding tool elements, FIG. 2a a perspective view of the connector element in a first embodiment together with a sectional view of the carrier, FIG. 2b perspective view of the connector element in a second embodiment together with a sectional view of the carrier, FIG. 3a a perspective view of the connector element of FIG. 2b and a sliding tool element together with a sectional view of the carrier, FIG. 3b a further perspective view of the connector element of FIG. 2b and a sliding tool element together with a sectional view of the carrier, FIG. 4a an illustration of a first exemplary manufacturing process of a vehicle interior trim part according to FIG. 2a, FIG. 4b an illustration of a second exemplary manufacturing process for a vehicle interior trim part according to FIG. 2b.

FIG. 1 shows a perspective view of a vehicle interior trim part 10 at the point in time of a method step for manufacturing the vehicle interior trim part 10. As can be seen from FIG. 1, a connector element 100 is partially surrounded by a carrier 30 of the vehicle interior trim part 10. The vehicle interior trim part 10 comprises an integrated electrical or optical device 20 (not shown) which is at least partially surrounded by the carrier 30. A part of a guide element 150 of the connector element 100 is exposed, that is, is not sealed in the injection molding of the carrier, and extends away substantially perpendicularly from the carrier 30. The guide element 150 is tubular with a substantially oval cross-section and provides a receptacle for a plug, via which the electrical or optical device 20 can be connected directly or indirectly to vehicle electronics. In addition, the guide element 150 has a latching element 155 for securing the plug connection with a plug. The connector element 100 comprises a base element 200 that is at least partially surrounded by the carrier 30. The base element 200 is plate-shaped and extends laterally with respect to the carrier 30. The base area of the base element 200 in this case is larger than the base area of the guide element 150 arranged thereon and extending away from the base element 200. The guide element 150 extends perpendicularly from the base element 200. The base element 200 has four outer sides. Two opposite inclined outer sides 242, 244 engage two sliding tool elements 300. The sliding tool elements 300 have prism-shaped engaging elements which are in positive engagement with the inclined outer sides 242, 244 of the base element 200. Furthermore, the base element 200 has two further opposite parallel outer sides 246, 248. The carrier 30 comprises retaining ribs 35 extending away from the carrier 30 and extending partially laterally with respect to the carrier in a hook-like manner. The retaining ribs 35 positively engage in the parallel outer sides 246, 248 of the base element 200. Alternatively or additionally, the retaining ribs 35 can engage in the connector element 100, in particular in the base element 200, in a materially bonded manner.

Figure 2A:
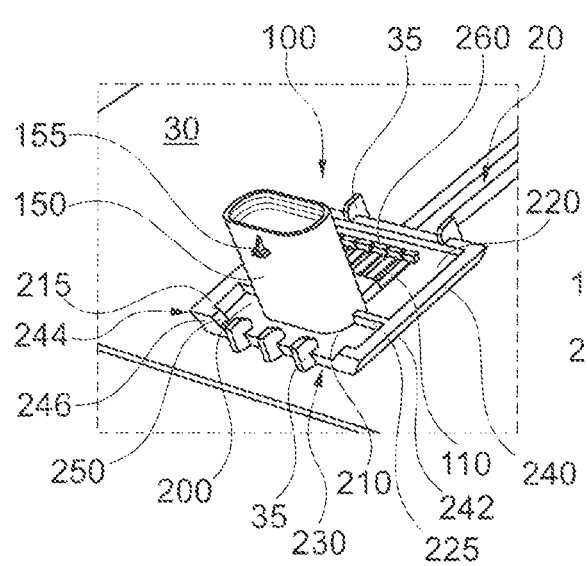
Figure 2B:
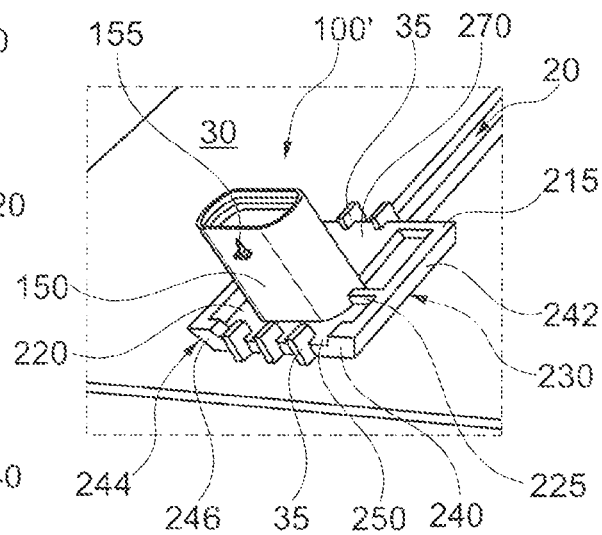

FIGS. 2a and 2b show two embodiments of a vehicle interior trim part 10 in a perspective detailed view of the connector element 100; 100'. To illustrate the arrangement of connector element 100; 100' and carrier 30, the carrier 30 is additionally depicted in a section with the retaining ribs 35 highlighted. The sectional plane of the carrier 30 shown runs in a neutral plane defined by the contact surface between a back 230 of the base element 200 and the carrier 30. In addition, retaining ribs 35 of the carrier 30 are highlighted in a further sectional view, the sectional plane running perpendicular to the neutral plane.

In a first embodiment according to FIG. 2a, a connector element 100 and a partial view of a carrier 30 are shown. The connector element 100 comprises a base element 200, a guide element 150 and connector pins 110 which (not visible) protrude partially perpendicularly from the base element 200 and are surrounded by the guide element 150. The base element 200 is plate-shaped and extends laterally with respect to the carrier 30. The base element 200 defines a front 210, a back 230 arranged opposite and parallel to the front 210, and a side area 240 extending along the perimeter of the base element 200 between the front 210 and the back 230. The side area 240 defines four outer sides. Two opposite outer sides are inclined outer sides 242, 244, which converge towards the back 230 towards each other. The two further opposite outer sides 246, 248 are aligned parallel to one another. The carrier 30 comprises retaining ribs 35 which positively engage in the edge section 215. The retaining ribs can be back-molded from the back and/or through the electrical or optical device 20, for example. The back 230 is connected to the carrier 30 and can be substantially planar. The guide element 150 extends away from the front 210 of the base element 200. The front 210 comprises an edge section 215 abutting against the side area 240. The edge section 215 is spaced from the guide element 150. Recesses 220 are partially arranged between the edge section 215 and the guide element 150. Support ribs 225 are arranged in the recesses 220 and run between the guide element 150 and the edge section 215. The connector element 100, in particular the base element 200 and/or the front 210 of the base element 200, is preferably only clasped and/or covered by the retaining ribs 35. In other embodiments, at least a part of the front 210 of the base element 200 can be covered and/or encased by the carrier 30. This increases the mechanical stability of the connector element 100 in the carrier 30. Additional stability of the connector element 100 is made available by the support ribs 225. The edge section 215 can be configured to run around the guide element 150. According to the embodiments of FIGS. 2a and 2b, the edge section 215 comprises a depression 250 into which part of the retaining ribs 35 of the carrier 30 engages. The depression 250 is designed coplanar with the recesses 220. As a result, the stabilizing effect provided by the retaining ribs 35 for the arrangement of the connector element 100; 100' in the carrier 30 is increased and errors in the injection molding, for example, when the base element 200 is partially over-moulded, can be minimized.

In the embodiment according to FIG. 2a, the connector element 100 comprises four connector pins 110. One end of each connector pin 110 is arranged in the guide element 150. At their second end, the connector pins 110 are connected to the electrical or optical device 20 and/or supply lines that are part of the electrical or optical device 20. In the region of the base element 200, part of the connector pins 110 extends away from the respective end arranged in the guide element 150. The connector pins 110 run parallel to the inclined outer sides 242, 244 of the base element 200. The connector pins 110 partially extend laterally with respect to the base element 200. A part of the connector pins 110 is encased by the base element 200 in a section 270 of the base element 200 that abuts against the guide element 150. The section 270 abutting against the guide element 150 is designed to be planar with respect to the edge section 215 of the base element 200. A further part of the connector pins 110 is arranged in an exposed manner on the base element 200. The connector pins 110 are arranged between support elements 260 which are opposite the section 270 abutting against the guide element 150. The support elements 260 are designed to be planar with respect to the edge section 215 and are spaced apart therefrom.

A second embodiment of a connector element 100' is shown in FIG. 2b. In comparison to the connector element 100 shown in FIG. 2a, the connector pins 110 are arranged completely in the connector element 100' and are surrounded thereby. The section 270 of the base element 200 that abuts against the guide element 150 and in which part of the connector pins 110 is received and surrounded thereby extends to the edge section 215 of the base element 200.

Figure 3A:
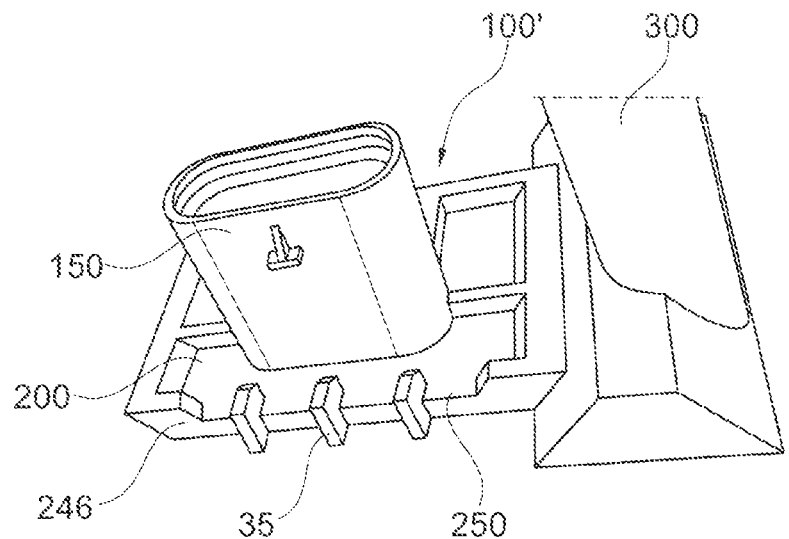
Figure 3B:
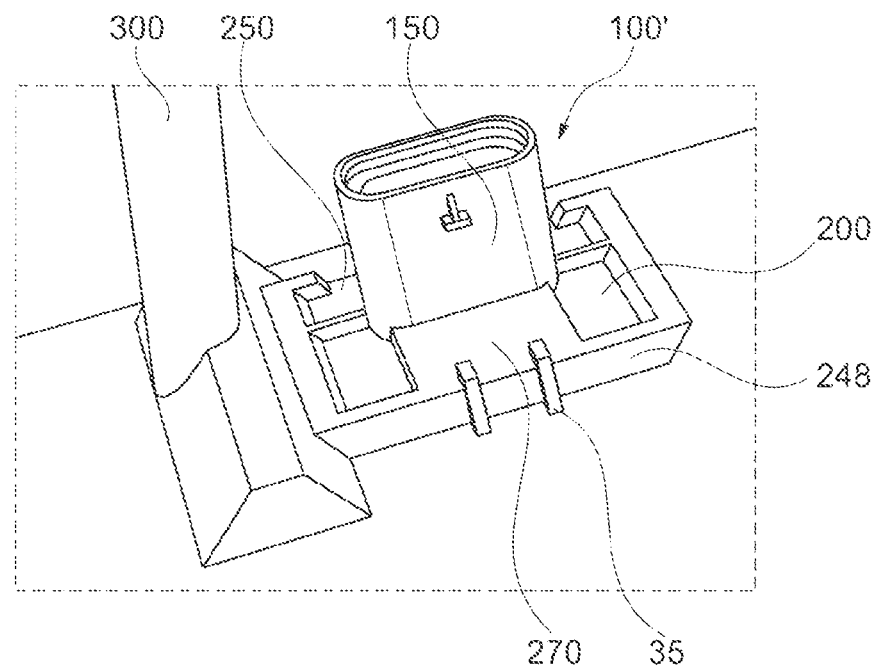

FIGS. 3a and 3b show two perspective detailed views of a connector element 100' according to the embodiment of FIG. 2b at the time of a method step for manufacturing a vehicle interior trim part 10 according to the disclosure. One of two sliding tool elements 300 is shown, the sliding tool element positively engaging in an outer side 242 of the two inclined outer sides 242, 244 of the connector element 100'. The sliding tool element 300 comprises an engaging element configured as a prism having a trapezoid as a base area. The long base of the trapezoid extends in the neutral plane, that is, the engaging element abuts against the carrier 35. The engaging element has two different leg lengths, the side of the prism-shaped engaging element being formed by the short leg of the trapezoid engaging in the base element 200. The second sliding tool element 300 is designed analogously to the first sliding tool element 300 and positively engages in the second inclined outer side 244 of the two inclined outer sides 242, 244 of the base element 200, as can be seen from FIG. 1. The base element 200 is clamped between the slide tool elements 300. This arrangement and design of the sliding tool elements 300 implements a particularly stable positioning and stabilization of the connector element 100; 100' during the overmolding process of the connector element 100; 100' with the carrier 30.

Figure 4A:
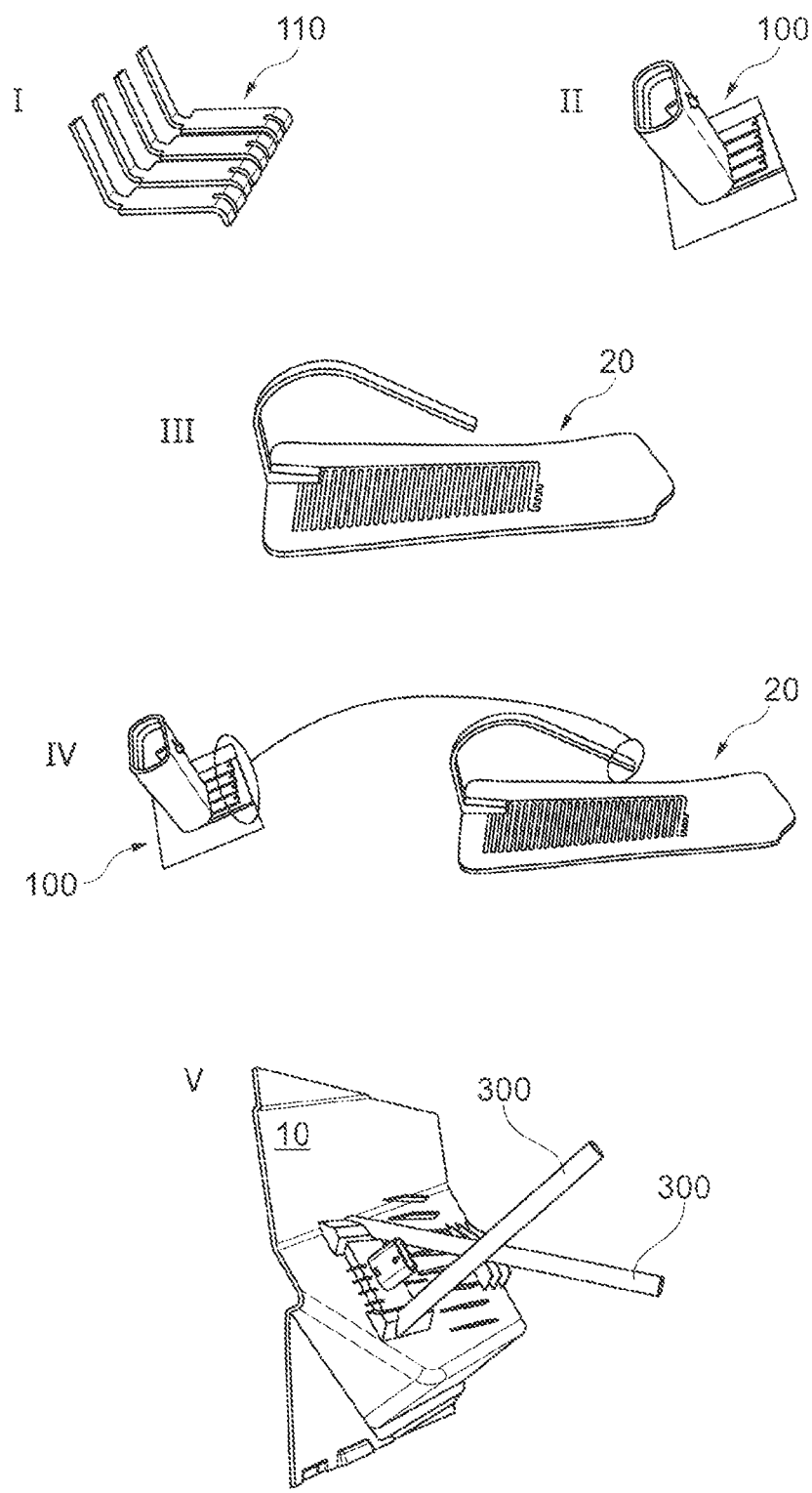
Figure 4B:
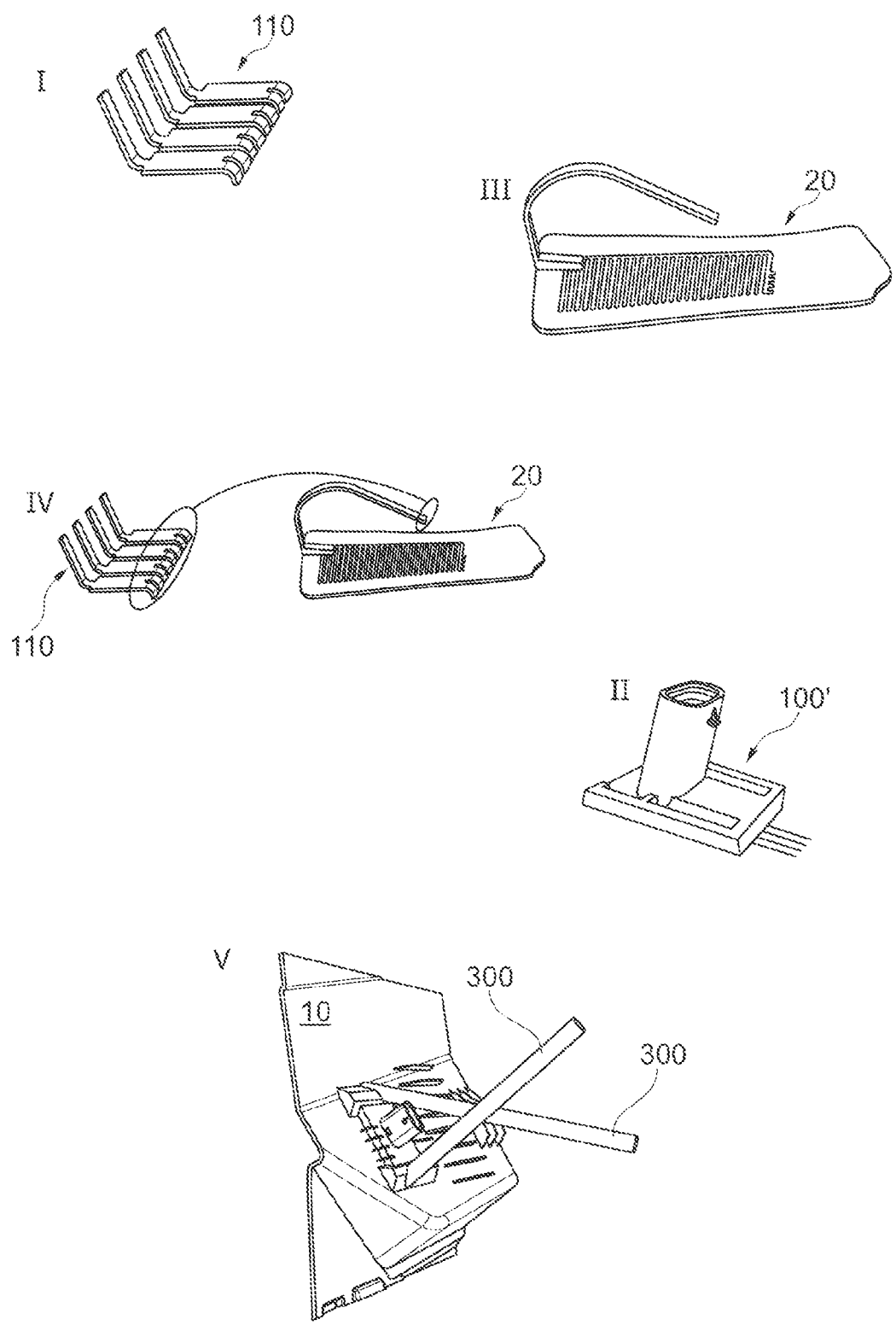

FIGS. 4a and 4b schematically depict two exemplary methods for manufacturing a vehicle interior trim part 10 according to the disclosure. Reference is made to the above description relating to FIGS. 1 to 3b. In particular, FIG. 4a shows a method in which a connector element 100 according to FIG. 2a is provided by way of example, and FIG. 4b shows a method in which a connector element 100' according to FIG. 2b is provided by way of example.

In the first step I according to FIG. 4a, four connector pins 110 are provided for a physical connection and a functional connection. In the second step II, a connector element 100 is injection molded. In particular, the connector element 100 can comprise a connector element 100 having the features according to FIG. 2*a*. In the following step III, an electrical device 20, for example, a heating mat, is provided. In the fourth step IV, the connector pins 110 are connected to the electrical device 20. For example, supply lines of the electrical device 20 can be soldered to the connector pins 110 in the part of the connector pins 110 exposed on the base element 200. Finally, in the last step V, the vehicle interior trim part 10 is formed by back-molding or overmolding of the connector element 100 and the electrical device 20 with a carrier 30. In this case, the connector element 100 can be positioned and supported by the sliding tool elements 300. A similar method is possible for an optical connection, wherein connector pins which are suitable for forwarding an optical signal can be used.

Following FIG. 4*b*, four connector pins 110 are first provided for a physical electrical connection and a functional electrical connection (step I) and an electrical device 20 (step III), for example, a heating mat. In the subsequent step IV, the connector pins 110 are connected to the electrical device 20. A connector element 100' is then injection molded according to step II. In particular, the connector element 100' can comprise a connector element 100' having the features according to FIG. 2*b*. In addition, at least part of the electrical device 20 can be overmolded with the connector element 100' at this point in time of the method. Finally, in the last step V, the vehicle interior trim part 10 is formed by overmolding of the connector element 100' and the electrical device 20 with a carrier 30. In this case, the connector element 100' can be positioned and supported by the sliding tool elements 300. A similar method is possible for an optical connection, wherein connector pins which are suitable for forwarding an optical signal can be used.

What is claimed is:

1. A vehicle interior trim part with an integrated electrical or optical device, the vehicle interior trim part comprising:
   a carrier; and
   a connector element for connecting the electrical or optical device, wherein the connector element is partially overmolded by the carrier and wherein the connector element comprises:
      at least one connector pin operatively connected to the electrical or optical device;
      a guide element in which the connector pin is at least partially received and which is adapted to provide a plug receptacle for a positive connection of the connector pin; and
      a base element extending substantially laterally with respect to the carrier.

2. The vehicle interior trim part according to claim 1, wherein the vehicle interior trim part is at least partially an injection molded part and the carrier is at least one of materially bonded to or positively connected to the connector element.

3. The vehicle interior trim part according to claim 1, wherein a base area of the base element is larger than a base area of the guide element.

4. The vehicle interior trim part according to claim 1, wherein the base element defines a front portion from which the guide element extends away, wherein the front comprises an edge section that surrounds the guide element, wherein one or more recesses are at least partially arranged between the guide element and the edge section.

5. The vehicle interior trim part according to claim 4, wherein the carrier comprises one or more retaining ribs which are at least one of materially bonded to or positively connected to the base element.

6. The vehicle interior trim part according to claim 4, wherein the guide element extends substantially laterally with respect to the carrier.

7. The vehicle interior trim part according to claim 4, wherein one or more support ribs are arranged in the one or more recesses, and wherein the support ribs are configurable to be connected to the guide element and the edge section.

8. The vehicle interior trim part according to claim 1, wherein the base element defines a front portion and a back portion located opposite the front portion, wherein the base element further comprises a side area connecting the front portion and the back portion, wherein the side area defines two opposite inclined outer sides which extend at an angle between the back portion and the front portion.

9. The vehicle interior trim part according to claim 8, wherein the back portion is arranged parallel to the front portion.

10. The vehicle interior trim part according to claim 8, wherein the inclined outer sides and the back portion extend at an obtuse angle to one another.

11. The vehicle interior trim part according to claim 1, wherein the at least one connector pin is arranged partially in and/or on the base element and partially extends laterally with respect to the carrier.

12. The vehicle interior trim part according to claim 1, wherein the carrier is made of a first plastic, and the connector element is made of a second plastic different from the first.

13. The vehicle interior trim part according to claim 1, wherein the connector element comprises one or more support elements which are arranged on a front portion of the base element from which the guide element extends away, and wherein the at least one connector pin is arranged partially between the one or more support elements in a longitudinal direction.

14. A method for manufacturing a vehicle interior trim part with an integrated electrical or optical device, the method comprising:
   providing at least one connector pin;
   injection molding a connector element, wherein the connector element comprises a base element and a guide element, wherein the at least one connector pin is at least partially received in the guide element, and wherein the guide element is adapted to provide a plug receptacle for a positive connection of the connector pin;
   providing at least one of an electrical device or an optical device;
   operatively connecting at least one of the electrical device or the optical device to the at least one connector; and
   at least partially back-molding or overmolding the connector element and at least one of the electrical device or the optical device with a carrier.

15. The method according to claim 14, wherein the connector element is positioned and supported in by one or more movable slide tool elements, wherein the one or more movable slide tool elements positively engage into two opposite inclined outer sides of the base element.

16. A vehicle interior trim part with an integrated electrical device or optical device, the vehicle interior trim part comprising:
   a carrier; and
   a connector element for connecting the electrical device or optical device, and the connector element comprising:
      at least one connector pin operatively connected to the electrical device or optical device;

a guide element in which the connector pin is at least partially received and which is adapted to provide a plug receptacle for a positive connection of the connector pin; and a base element extending substantially laterally with respect to the carrier, wherein the base element defines a front portion from which the guide element extends away, wherein the front comprises an edge section that surrounds the guide element, wherein one or more recesses are at least partially arranged between the guide element and the edge section, and wherein a base area of the base element is larger than a base area of the guide element.

17. The vehicle interior trim part according to claim 16, wherein the carrier comprises one or more retaining ribs which are at least one of materially bonded to or positively connected to the base element, wherein the guide element extends substantially laterally with respect to the carrier, wherein one or more support ribs are arranged in the one or more recesses, and wherein the support ribs are configurable to be connected to the guide element and the edge section.

18. The vehicle interior trim part according to claim 16, wherein the vehicle interior trim part is at least partially an injection molded part and the carrier is at least one of materially bonded to or positively connected to the connector element.

19. The vehicle interior trim part according to claim 16, wherein the carrier is made of a first plastic, and the connector element is made of a second plastic different from the first.

20. The vehicle interior trim part according to claim 16, wherein the base element further defines a back portion located opposite the front portion, wherein the base element further comprises a side area connecting the front portion and the back portion, wherein the side area defines two opposite inclined outer sides which extend at an angle between the back portion and the front portion.

* * * * *